United States Patent

[11] 3,607,388

[72] Inventors Hiroo Hori
Kawasaki-shi;
Shigeo Tsuji, Fujisawa-shi; Yuji Kiuchi,
Yokohama-shi, all of, Japan

[21] Appl. No. 713,043
[22] Filed Mar. 14, 1968
[45] Patented Sept. 21, 1971
[73] Assignee Tokyo Shibaura Electric Co., Ltd.
Kawasaki-shi, Japan
[32] Priority Mar. 18, 1967
[33] Japan
[31] 42/16707

[54] METHOD OF PREPARING PHOTOCONDUCTIVE LAYERS ON SUBSTRATES
3 Claims, 4 Drawing Figs.

[52] U.S. Cl. .................... 117/224, 117/201, 252/501, 96/1.5
[51] Int. Cl. .................... B44d 1/02, G03g 5/00
[50] Field of Search .................... 252/501; 96/1.5, 1; 117/201, 224

[56] References Cited

UNITED STATES PATENTS

| | | | |
|---|---|---|---|
| 3,026,218 | 3/1962 | Morgan | 117/201 |
| 3,048,502 | 8/1962 | Nicholson | 117/211 |
| 3,307,983 | 3/1967 | De Hann et al. | 148/178 |

*Primary Examiner*—George F. Lesmes
*Assistant Examiner*—M. B. Wittenberg
*Attorney*—George B. Oujevolk

ABSTRACT: A method of preparing a vapor-deposited layer having photoconductivity on a substrate, in which lead oxide and at least one of the compounds selected from the group consisting of chalcogenides of Cu, Ag, Zn, Cd, Hg, Ga, In, Tl, Ge, Sn, Sb and Bi are evaporated simultaneously from separate sources, and are vapor-deposited on the substrate. This vapor deposition is carried out in an oxygen or oxygen-containing atmosphere.

INVENTORS
Hiroo Hori, Shigeo Tsuji
and Yuji Kondo
BY
George B. Oujevolk
Attorney Hiroo Hori
Sigeo Tsuji
Yuji Kiuchi
INVENTORS BY George B. Oujevolk
Attorney

METHOD OF PREPARING PHOTOCONDUCTIVE LAYERS ON SUBSTRATES

This relates to methods of preparing photoconductive layers on substrates, which are utilized particularly, but not exclusively, as vidicon targets of image pickup tubes.

It is known that a lead oxide-lead sulfide layer formed on a substrate has various properties suited for a target of a vidicon tube. The lead oxide-lead sulfide layer is obtained, for example, by placing within a vacuum vessel a substrate provided with tin oxide electrodes, vapor-depositing lead oxide on said electrodes in the form of a thin layer in an oxygen atmosphere having a pressure of the order of $6\times10^{13}$ mm. Hg, diffusing sulfur into the said lead oxide layer for 30 to 60 minutes at a temperature of 60° C. to 70° C., activating the resulting layer for 2 to 3 minutes at a temperature of approximately 250° C., and then quickly cooling the layer. The layer thus formed on the substrate exhibits a desired photoconductivity, since oxygen atoms are contained in lead oxide are replaced partly by sulfur atoms during the thermal treatment in the sulfur vapor atmosphere. The lead oxide-lead sulfide layer thus manufactured, however, has the following defects.

1. The dark resistance of the layer varies greatly depending upon the condition of thermal treatment in the sulfur vapor atmosphere.

2. The density of the lead oxide layer becomes high during heat treatment, with the result that the response time characteristics of the layer is deteriorated, thus causing the phenomenon of image sticking. This is extremely detrimental to the function of a vidicon target.

Known photoconductive substances are, lead chalcogenides, such as, for example, lead sulfide, lead selenide and lead telluride, and impurity-doped germanium and silicone are known as photoconductive substances. These photoconductive substances, however, can not be used as vidicon targets since their resistivity is small and thus they have no capability of storing electrical charges.

This invention provides a method of preparing a photoconductive layer on a substrate, comprising simultaneously vapor depositing on said substrate lead oxide and at least one of the compounds selected from the group consisting of chalcogenides of Cu, Ag, An, Cd, Hg, Ga, In, Tl, Ge, Sn, As, Sb and Bi, in an oxygen or oxygen-containing atmosphere.

According to the method of this invention, lead oxide and the chalcogenide described above are simultaneously vapor deposited on a substrate. The resulting photoconductive layer has an excellent response time characteristic, namely the characteristics that the photocurrent remaining upon termination of exposure to incident light decays in a short period of time, so that the photoconductive layer of this nature may thus be advantageously used as a target of a vidicon tube.

The invention will now be described, by way of example, with reference to the accompanying drawings, in which.

The chalcogenides employed in the method of this invention are chalcogenides of Cu, Ag, Zn, Cd, Hg, Ga, In, Tl, Ge, Sn, As, Sb and Bi. The term "chalcogenides" is used herein in its narrowest sense and intended to mean sulfides, selenides and tellurides. Typical examples of these chalcogenides include antimony trisulfide, arsenic trisulfide, bismuth trisulfide antimony triselenide, arsenic triselenide, bismuth triselenide, antimony tritelluride, arsenic tritelluride and bismuth tritelluride.

It is not clear what substance of chemical structure is produced when the chalcogenide is vapor deposited on a substrate together with lead oxide. But it has been found that the resulting photoconductive layer exhibits high sensitivity to light of longer wavelength, such as infrared rays, when compared with a layer independently formed either of lead oxide or one of the chalcogenides described above, which has a low sensitivity to light of longer wavelength. This shows that the layer obtained in accordance with the invention contains newly produced compounds rather than lead oxide or chalcogenide in its independent form. Although these compounds are considered to be lead sulfide, lead selenide and lead telluride, their presence can not be detected by presently known structure-analysis methods due to an extremely small amount present.

Figures 1, 2:
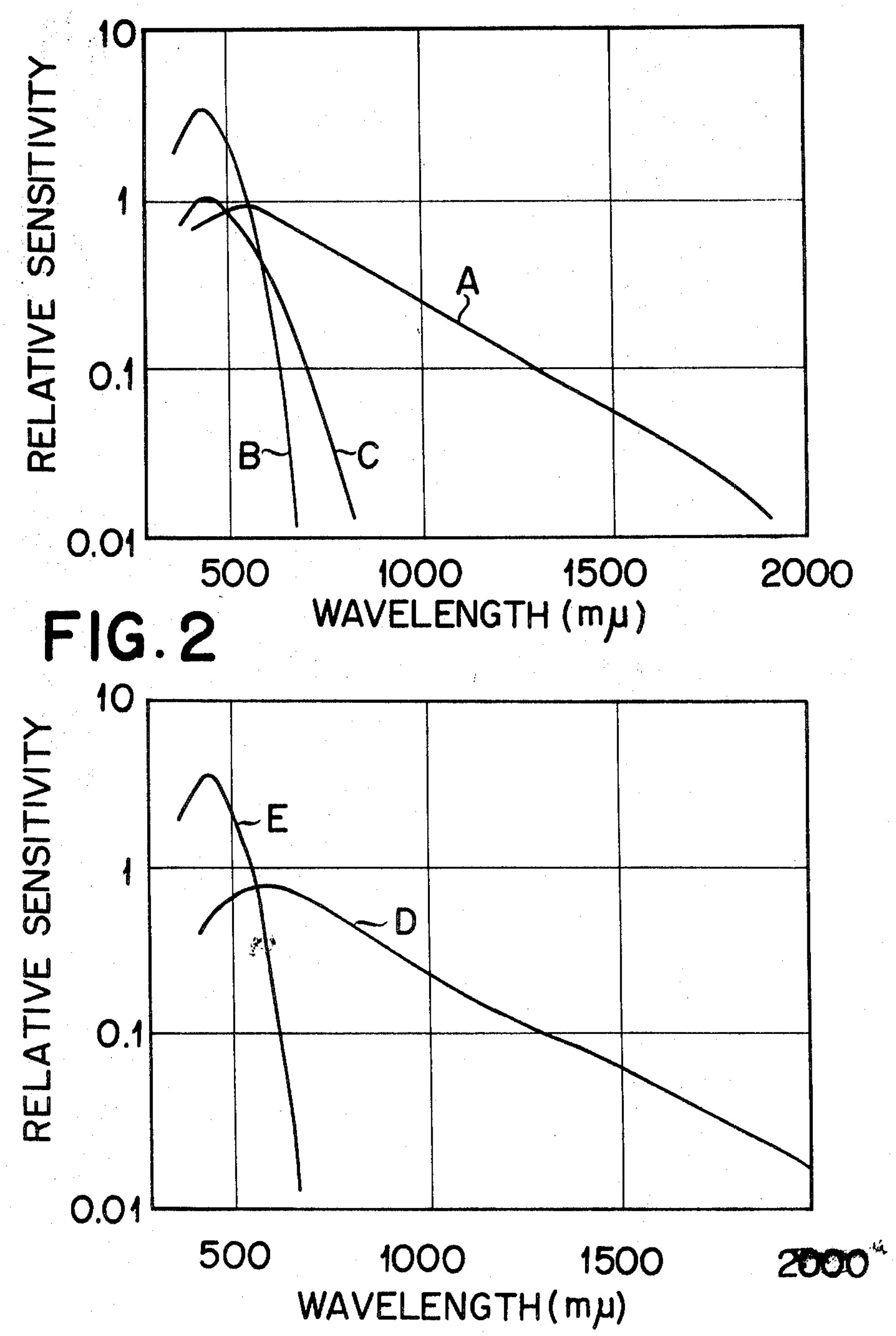
FIG. 1 is a graph showing the spectral sensitivities of a photoconductive layer prepared by an example of the method of this invention, lead oxide and an antimony trisulfide layer.
FIG. 2 is a graph showing spectral sensitivities prepared by another example of the method according to this invention and a lead oxide layer.

The spectral sensitivity characteristic of the photoconductive layer produced by a method according to this invention is shown in FIG. 1. This layer is formed by vapor-depositing on a substrate lead oxide and antimony trisulfide from separate sources of evaporation. Curves A, B and C in FIG. 1 show the spectral sensitivity characteristics obtained from a lead oxide-antimony trisulfide photoconductive layer produced as described, a lead oxide layer and an antimony trisulfide layer, respectively.

FIG. 2 shows the sensitivity characteristic of a photoconductive layer produced by another exemplary method of the invention. This layer is prepared by vapor depositing on a substrate lead oxide, thallium sulfide and antimony triselenide, all simultaneously from separate sources of evaporation. The spectral sensitivity of this layer is shown by curve D, and that of a lead oxide layer is indicated by curve E.

Figure 3:
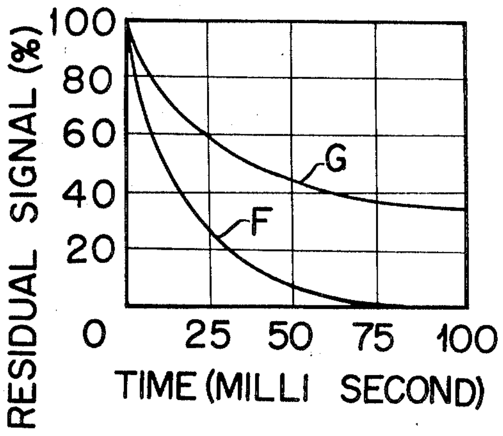
FIG. 3 is a graph showing the lag characteristics of a photoconductive layer prepared by a method according to this invention and that of a conventionally prepared photoconductive layer.

As a vidicon target, the photoconductive layer of this invention exhibits excellent response time characteristics. It has been found that the photocurrent in the layer after cessation of light decays within an extremely short period of time when compared with that of a known target manufactured by prior art. Curve F in FIG. 3 shown the lag characteristic of a photoconductive layer prepared by vapor deposition of lead oxide and antimony trisulfide upon a substrate. The same characteristic of a conventional lead oxide layer diffused with sulfur is shown by curve G. These curves clearly show that the layer of this invention has a shorter decay time and is more applicable as a vidicon target.

In order to achieve better results, the lead oxide and chalcogenide to be vapor deposited should be supplied from separate sources. One of the reasons for this is that temperature control is preferred to evaporate the substances at different evaporation temperatures at predetermined speeds and thereby to effect the vapor deposition at a desired ratio. Another reason is that the materials of containers for such vaporable substances should preferably be selected in accordance with the nature of the substances. For example, a container of platinum may be used for lead oxide, while a tantalum container is suited for antimony trisulfide.

As in an ordinary photoconductive layer, the trisulfide. of the deposited layer may be within the range of 5 to 20 $\mu$, preferably about 10 $\mu$. The thickness may be controlled by adjusting the amount of the deposit by suitable shutter means during the vapor deposition process.

In order to avoid decomposition of lead oxide, the vapor deposition process should be carried out in an oxygen-containing or pure oxygen atmosphere. The decomposition of lead oxide will have a damaging effect on the photoconductivity of the layer. During this process, the temperature of the substrate should be maintained in the range of 90° C. to 200° C., preferably at approximately 150° C. to obtain a layer of small density, whereby the photoconductivity, particularly, the lag characteristic, of the layer can be improved. The usual technique of vapor deposition may be used for carrying out the method of this invention in respect of matters and conditions not specified herein, as will be apparent to those skilled in the art, and hence a detailed description of it is omitted.

Figure 4:
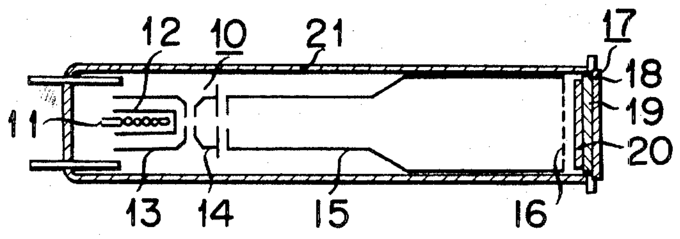
FIG. 4 illustrates a vidicon-type image tube incorporating a photoconductive layer prepared by a method in accordance with this invention.

A typical application of a layer produced in accordance with the invention will now be described, this application being a vidicon target which is shown in FIG. 4. The vidicon as illustrated comprises a vacuum vessel 21 containing an electron gun section 10 and a photoconductive target section 17. The electron gun section 10 comprises a heater 11, a cathode 12 surrounding the heater, and a control grid electrode 13 and an accelerating electrode 14 both disposed coaxially with the cathode 12. An electrode 4 is mounted coaxially with said accelerating electrode 15, and a mesh electrode 16 is disposed facing said cathode at the end of the electrode 15 opposite to the accelerating electrode 14. The photoconductive target section 17 comprises a transparent glass substrate 18, a transparent conductive layer 19 deposited on said substrate 18, and a multisubstance photoconductive target 20 obtained by a method in accordance with this invention, said target 20 being deposited on the conductive layer 19 to face with the mesh electrode 16. Although the electron gun section described is of a well-known construction, the provision of the improved photoconductive target 20 will give the vidicon-type image tube those effects already described. Namely, the vidicon constructed as described, has a good photoresponse characteristics and an extremely short decay-time characteristic and is free from image sticking. Further, the device is sensitive from the range of visible light to infrared light, so that it has an improved efficiency and a wider range of applications than a conventional vidicon, in particular, an infrared sensitive vidicon.

Examples of methods of forming the photoconductive layer in accordance with this invention are as follows.

The amount of the material to be vapor deposited was controlled by a shutter so that the thickness of the resulting layer in each of the Examples was about 10 $\mu$. Thus, the amounts of the materials specified in the Examples were not used to form a single layer.

EXAMPLE 1

A glass substrate is prepared by coating a transparent glass support with a transparent conductor film of uniform thickness which serve as a signal electrode. The substrate is placed in a vacuum vessel such as a bell jar and heated to a temperature of 150° C. The bell jar is evacuated and then filled with oxygen to have a pressure of $5\times10^{12}$ mm. Hg. Lead oxide and antimony trisulfide are simultaneously evaporated from a platinum boat and a tantalum boat respectively to be deposited on the surface of the conducting film of the substrate, whereby a porous deposited layer is formed.

EXAMPLE 2

2.5 grams of lead oxide and 0.1 to 0.5 gram of antimony triselenide are simultaneously evaporated from a platinum boat and a tantalum boat, respectively at 900° C. and 550° C., respectively to be deposited on a substrate.

EXAMPLE 3

2.5 grams of lead oxide and 0.1 to 0.5 gram of antimony tritelluride are simultaneously evaporated from a platinum boat and a tantalum boat, respectively at 900° C. and 580° C., respectively to be deposited on a substrate.

EXAMPLE 4

2.5 grams of lead oxide and 0.1 to 0.5 gram of bismuth trisulfide are simultaneously evaporated respectively from a platinum boat and a quartz crucible at 900° C. and 630° C., respectively to be deposited on a substrate.

EXAMPLE 5

Lead oxide and bismuth trisulfide in Example 4 are replaced by lead oxide and bismuth triselenide with the conditions set forth in the same Example.

EXAMPLE 6

2.5 grams of lead oxide and 0.1 to 0.5 gram of bismuth tritelluride are simultaneously evaporated from a platinum boat respectively and a quartz crucible at 900° C. and 490° C. respectively to be deposited on a substrate.

EXAMPLE 7

2.5 grams of lead oxide and 0.5 gram of a mixture of 60 percent antimony trisulfide and 40 percent antimony triselenide which are respectively heated at 900° C. and 500° C. in a platinum boat and a tantalum boat are vapor deposited simultaneously on a substrate.

EXAMPLE 8

2.5 grams of lead oxide, 0.3 gram of thallium sulfide and 0.2 gram of antimony triselenide heated respectively at 900° C., 400° C. and at 550° C. in a platinum boat, quartz crucible and a tantalum boat are simultaneously vapor deposited on a substrate.

EXAMPLE 9

2.5 grams of lead oxide and 0.1 to 0.5 gram of silver sulfide heated respectively at 900° C. and 800° C. in a platinum boat and an alumina crucible are simultaneously vapor deposited on a substrate.

EXAMPLE 10

2.5 grams of lead oxide and 0.1 to 0.5 gram of mercury sulfide heated respectively at 900° C. and 580° C. in a platinum boat and a quartz crucible are simultaneously vapor deposited on a substrate.

EXAMPLE 11

2.5 grams of lead oxide and 0.1 to 0.5 gram of germanium sulfide heated respectively to 900° C. and 550° C. in a platinum boat and a quartz crucible are simultaneously vapor deposited on a substrate.

In Examples 1 to 11, the materials are vapor deposited on a substrate maintained at a temperature of 150° C. in an oxygen atmosphere having a pressure of $5\times10^{12}$mm. Hg. The photoconductive layers obtained according to the foregoing Examples respectively have a better lag characteristic than conventional lead oxide layers activated with sulfur vapor. The specific resistance of each layer is in the order of $10^{12}$ ohm-cm., which is a property suited for a vidicon target. The layer prepared by a method according to this invention may of course be utilized as a photoconductive element for general purposes.

While the invention has been described in connection with some preferred embodiments thereof, the invention is not limited thereto and includes any modifications and alternations which fall within the true spirit and scope of the invention as defined in the appended claims.

What is claimed is:

1. A method of preparing a photoconductive layer on a substrate comprising:

simultaneously codepositing from vapor, on said substrate, from at least two separately heated crucibles, one of said crucibles containing lead oxide and at least one other of said crucibles containing at least one chalcogenide of an element selected from the group consisting of Cu, Ag, Zn, Cd, Hg, Ga, In, Tl, Ge, Sn, As, Sb, and Bi, while maintaining said crucibles and said substrate in an oxygen containing atmosphere and said substrate being maintained at a temperature between about 90° C. and 200° C.

2. A method according to claim 1 in which said substrate is a substrate in a target of an image pickup tube.

3. A method according to claim 1 in which the thickness of said substrate is in the range of 5 to 20 $\mu$.

UNITED STATES PATENT OFFICE
CERTIFICATE OF CORRECTION

Patent No. 3,607,388 Dated September 21, 1971

Inventor(s) Hiroo Hori, et al

It is certified that error appears in the above-identified patent and that said Letters Patent are hereby corrected as shown below:

Column 1, line 14, "6 X $10^{13}$mm. Hg," should read 6 X $10^{-3}$mm. Hg, -- . Column 3, line 47, "5 X $10^{12}$mm. Hg." should read -- 5 X $10^{-2}$mm. Hg. -- . Column 4, line 43, "5 X $10^{12}$mm. Hg." should read -- 5 X $10^{-2}$mm. Hg. -- .

Signed and sealed this 14th day of November 1972.

(SEAL)
Attest:

EDWARD M.FLETCHER,JR.
Attesting Officer

ROBERT GOTTSCHALK
Commissioner of Patents